(12) United States Patent
Addanki et al.

(10) Patent No.: US 9,884,545 B1
(45) Date of Patent: Feb. 6, 2018

(54) TRACTION BATTERY MOUNTING ASSEMBLY AND SECURING METHOD

(71) Applicant: Ford Global Technologies, LLC, Dearborn, MI (US)

(72) Inventors: Hari Krishna Addanki, Novi, MI (US); Masahiro Kimoto, Plymouth, MI (US); Patrick Daniel Maguire, Ann Arbor, MI (US); Kevin A. Montgomery, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/340,910

(22) Filed: Nov. 1, 2016

(51) Int. Cl.
*B60K 1/04* (2006.01)
*B60K 6/40* (2007.10)
*B60K 6/445* (2007.10)
*F16F 15/04* (2006.01)
*H01M 2/10* (2006.01)

(52) U.S. Cl.
CPC ............ *B60K 1/04* (2013.01); *B60K 6/40* (2013.01); *B60K 6/445* (2013.01); *F16F 15/04* (2013.01); *H01M 2/1083* (2013.01); *B60K 2001/0438* (2013.01); *B60Y 2200/91* (2013.01); *B60Y 2200/92* (2013.01); *B60Y 2400/48* (2013.01); *B60Y 2410/115* (2013.01); *H01M 2220/20* (2013.01); *Y10S 903/951* (2013.01)

(58) Field of Classification Search
CPC ........ B60K 2001/0438; B60Y 2400/48; B60Y 2410/115
See application file for complete search history.

(56) References Cited

U.S. PATENT DOCUMENTS

| | | | |
|---|---|---|---|
| 4,969,662 A | 11/1990 | Stuart | |
| 6,151,930 A | 11/2000 | Carlson | |
| 6,460,662 B2 | 10/2002 | Niaura et al. | |
| 8,344,526 B2 | 1/2013 | Bhat et al. | |
| 8,614,518 B2 | 12/2013 | Li et al. | |
| 2011/0180336 A1* | 7/2011 | Kurata | B60L 11/1812 180/65.1 |
| 2013/0162075 A1* | 6/2013 | Chinavare | H05K 9/0098 310/85 |
| 2013/0192914 A1* | 8/2013 | Nakamori | B60K 1/04 180/68.5 |
| 2014/0284125 A1* | 9/2014 | Katayama | B60K 1/04 180/68.5 |

(Continued)

FOREIGN PATENT DOCUMENTS

CN 104829877 8/2015
CN 105164447 12/2015

(Continued)

*Primary Examiner* — Brian L Swenson
(74) *Attorney, Agent, or Firm* — Carlson, Gaskey & Olds, P.C.

(57) ABSTRACT

An exemplary traction battery mounting assembly includes a traction battery and a damper securing the traction battery to a vehicle frame such that the traction battery can move together relative to the vehicle frame when secured to the vehicle frame. An exemplary traction battery securing method includes securing a traction battery in an installed position where the traction battery is mounted to a vehicle frame. The traction battery is moveable relative to the vehicle frame when in the installed position.

15 Claims, 3 Drawing Sheets

(56) References Cited

U.S. PATENT DOCUMENTS

| | | | | |
|---|---|---|---|---|
| 2014/0329125 A1* | 11/2014 | Miyanaga | ........... | B60R 13/0861 |
| | | | | 429/100 |
| 2015/0239331 A1* | 8/2015 | Rawlinson | ............... | B60K 1/04 |
| | | | | 180/68.5 |
| 2016/0129806 A1* | 5/2016 | Yagami | ............... | B60L 11/1881 |
| | | | | 180/65.31 |
| 2016/0226041 A1* | 8/2016 | Jackson | ............. | H01M 2/1083 |
| 2017/0025902 A1* | 1/2017 | Yuasa | .................. | H04B 5/0093 |

FOREIGN PATENT DOCUMENTS

| | | |
|---|---|---|
| EP | 2340951 | 7/2011 |
| JP | 2016105361 | 6/2016 |

* cited by examiner

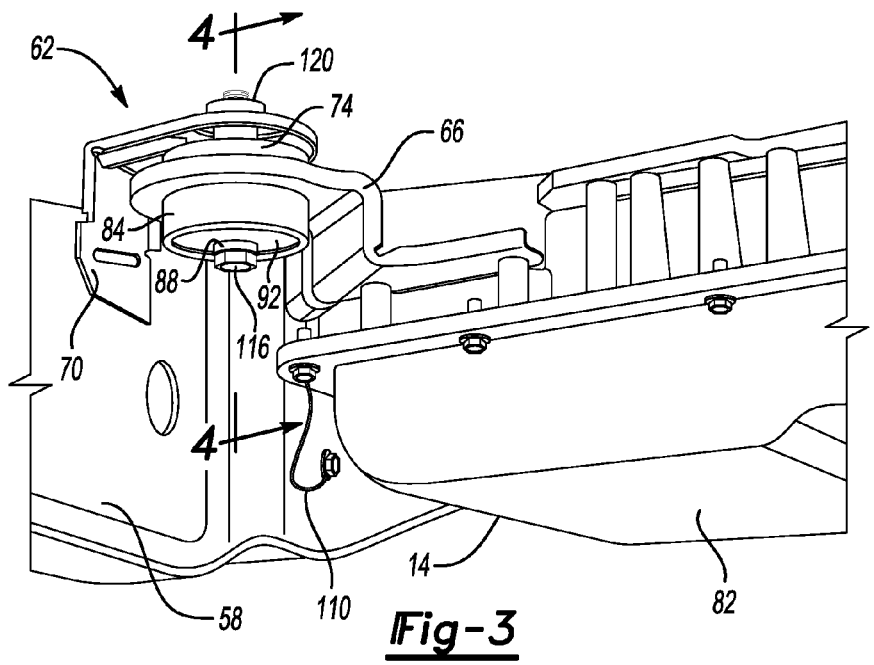
Fig-3
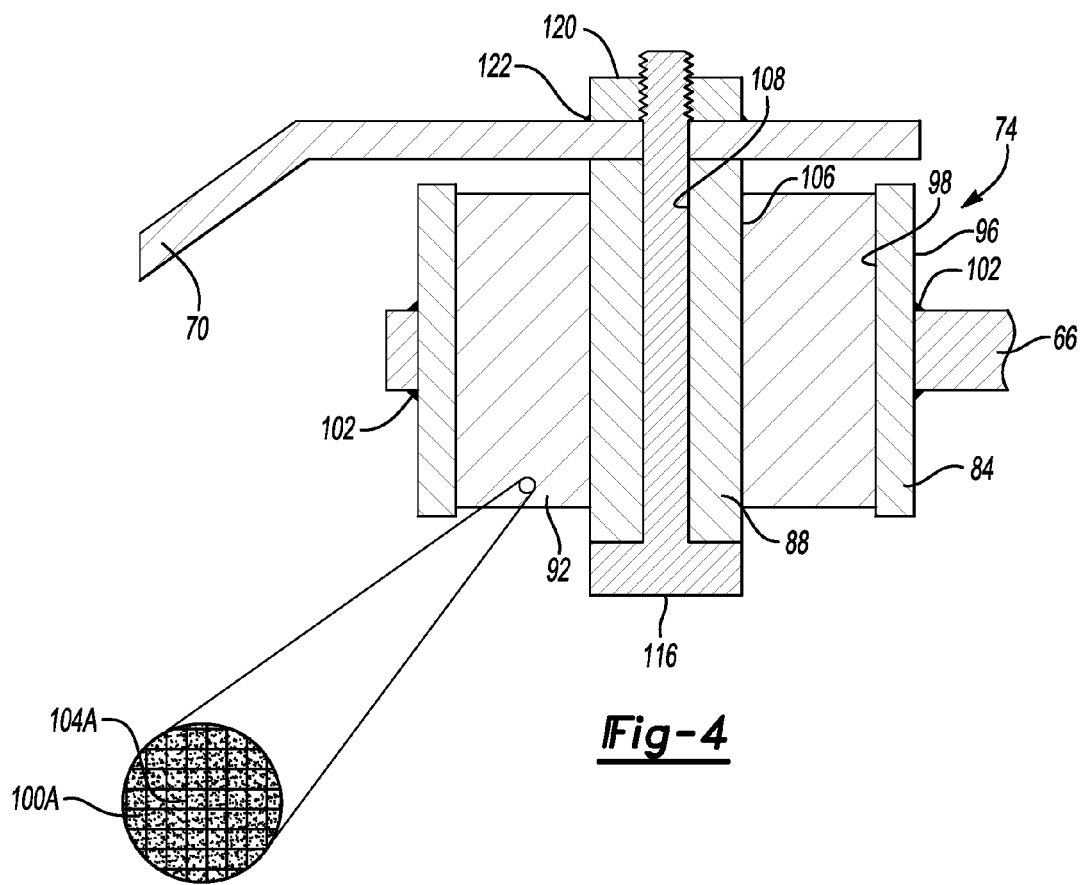
Fig-4
Fig-4A

TRACTION BATTERY MOUNTING ASSEMBLY AND SECURING METHOD

TECHNICAL FIELD

This disclosure relates to mounting a traction battery to a frame of an electrified vehicle and, more particularly, to a mounting assembly and securing method that permit some movement of the traction battery relative to the frame.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery can be used to selectively power the electric machines and other electrical loads of the electrified vehicle. The traction battery includes a plurality of interconnected battery cells that store energy for powering these electrical loads. The traction battery can be rigidly secured directly to a frame of the electrified vehicle and can be electrically grounded to the frame using a metallic lead.

SUMMARY

A traction battery mounting assembly according to an exemplary non-limiting embodiment includes, among other things, a traction battery and a damper securing the traction battery to a vehicle frame. The traction battery can move together relative to the vehicle frame when secured to the vehicle frame.

In another example of the foregoing assembly, the damper is electrically conductive such that the traction battery is electrically grounded to the vehicle frame through the damper.

In another example of any of the foregoing assemblies, a damping portion of the damper is electrically conductive and is compressible relative to a portion of the traction battery secured to the damper.

In another example of any of the foregoing assemblies, the damping portion includes an electrically conductive material distributed within an elastomeric material.

Another example of any of the foregoing assemblies includes an outer bushing, an inner bushing, and a damping portion of the damper. The damping portion securing the outer bushing to the inner bushing.

In another example of any of the foregoing assemblies, one of the outer bushing or the inner bushing is secured directly to the traction battery, and the other of outer bushing or the inner bushing is secured directly to the vehicle frame.

In another example of any of the foregoing assemblies, a lead electrically grounds the traction battery to the vehicle.

In another example of any of the foregoing assemblies, a first bracket of the traction battery is secured directly to the damper and a second bracket of the vehicle is secured directly to the damper.

In another example of any of the foregoing assemblies, the first bracket is entirely spaced from the second bracket such that no portion of the first bracket contacts any portion of the second bracket when the damper is securing the traction battery to the vehicle frame.

In another example of any of the foregoing assemblies, the damper secures the traction battery to an underbody of the vehicle.

A traction battery securing method includes, among other things, securing a traction battery in an installed position where the traction battery is mounted to a vehicle frame. The traction battery is moveable relative to the vehicle frame when in the installed position.

Another example of the foregoing method includes damping movement of the traction battery relative to the vehicle frame when the traction battery is in the installed position.

In another example of any of the foregoing methods, the traction battery is secured to the vehicle frame through a damper.

Another example of any of the foregoing methods includes electrically grounding the traction battery to the vehicle frame through the damper.

Another example of any of the foregoing methods includes a path for grounding the traction battery extends through a metallic material that is distributed within an elastomeric material of the damper.

In another example of any of the foregoing methods, the securing comprises securing a first bracket of the traction battery directly to the damper and securing a second bracket of the vehicle frame directly to the damper.

In another example of any of the foregoing methods, the damper includes a first bushing secured to the first bracket, a second bushing secured to the second bracket, and a damping portion connecting the first bushing to the second bushing.

Another example of any of the foregoing methods includes electrically grounding the traction battery to the vehicle frame through a metallic lead extending from the traction battery to the vehicle frame.

BRIEF DESCRIPTION OF THE FIGURES

The various features and advantages of the disclosed examples will become apparent to those skilled in the art from the detailed description. The figures that accompany the detailed description can be briefly described as follows:

FIG. 3 shows a close-up perspective view of a mounting assembly securing the traction battery of FIG. 2 to a vehicle frame in an installed position.

FIG. 4 illustrates a section view of the mounting assembly at line 3-3 in FIG. 3.

FIG. 4A illustrates a close up view of a damping portion in a damper of the mounting assembly.

DETAILED DESCRIPTION

This disclosure is directed toward mounting a traction battery to a frame of an electrified vehicle. When the traction battery is secured to the frame, a damper permits some movement of the traction battery relative to the frame. In some embodiments, the traction battery is grounded to the frame through the damper. These and other features are discussed in greater detail in the following paragraphs of this detailed description.

Figure 1:
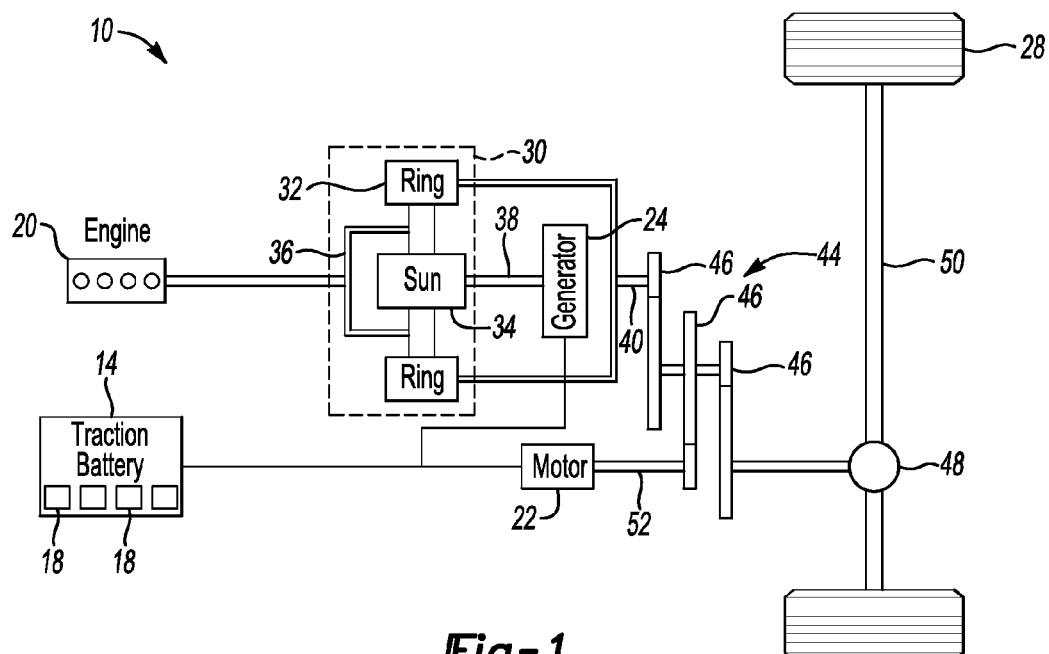
FIG. 1 illustrates a schematic view of an example powertrain for an electrified vehicle.

FIG. 1 schematically illustrates a powertrain 10 for an electrified vehicle. Although depicted as a hybrid electric vehicle (HEV), it should be understood that the concepts described herein are not limited to HEVs and could extend to any other type of electrified vehicle, including, but not limited to, plug-in hybrid electric vehicles (PHEVs), battery electric vehicles (BEVs), fuel cell vehicles, etc.

The powertrain 10 includes a battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery 14.

Figure 2:
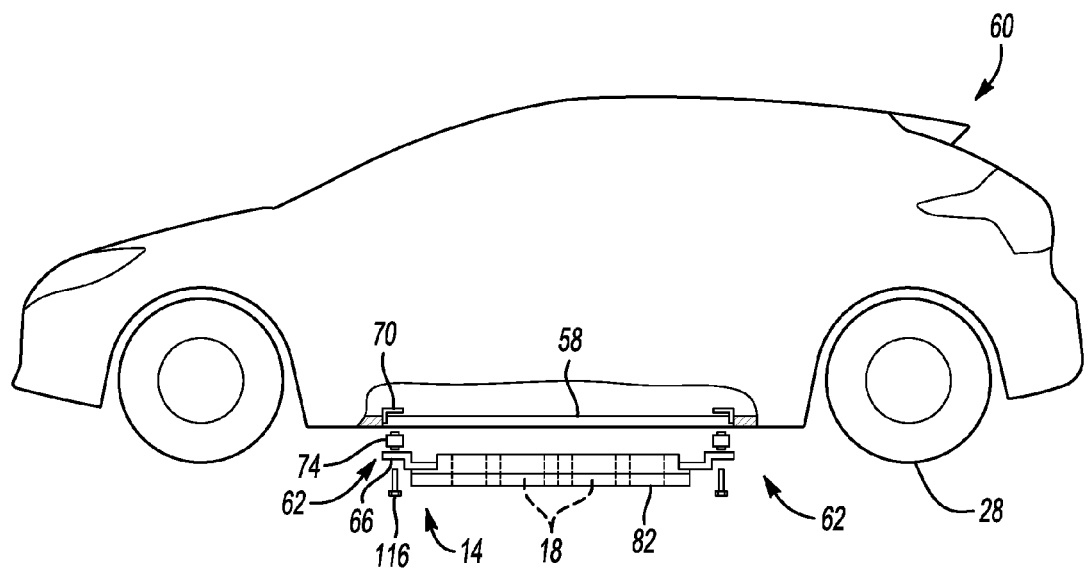
FIG. 2 illustrates a side view of an electrified vehicle having the powertrain of FIG. 1 and having selected portions cutaway and expanded to show a traction battery of the electrified vehicle.

Referring now to FIGS. 2 and 3, the traction battery 14 of the powertrain 10 is secured to a frame 58 of a vehicle 60 with at least one mounting assembly 62.

The vehicle 60 includes the powertrain 10. The vehicle 60 is an HEV. In another example, the vehicle 60 could be an all-electric vehicle.

The frame 58 is part of a chassis of the vehicle 60. When the traction battery 14 is secured to the frame 58, the traction battery 14 is secured to an underbody of the vehicle 60 and is outside a passenger compartment of the vehicle 60. FIG. 3 shows the traction battery 14 in an installed position where the traction battery 14 is mounted to the frame 58.

Generally, the mounting assembly 62 includes a bracket 66 of the traction battery 14, a bracket 70 of the frame 58, and a damper 74. In some non-limiting embodiments, the traction battery 14 is secured to the frame 78 with four separate mounting assemblies. In such examples, the traction battery 14 could have a generally rectangular profile with a separate mounting assembly disposed at each corner of the traction battery 14.

The traction battery 14 holds the battery arrays 18 within an enclosure 82. In some examples, the enclosure 82 is a metallic material. In other examples, the enclosure 82 is a polymer material.

The bracket 66 is rigidly secured to the enclosure 82 of the traction battery 14. In one non-limiting embodiment, the bracket 66 and the enclosure 82 are metallic, and the bracket 66 and the enclosure 82 are welded to each other. In another non-limiting embodiment, the enclosure 82 is a polymer material, and the bracket 66 is secured to the enclosure 82 using one or more mechanical fasteners, such as threaded fasteners.

The frame 58, which includes the bracket 70, is metallic. The bracket 70 can be rigidly connected to the remaining portions of the frame 58 via welds, for example. In another non-limiting embodiment, the bracket 70 is secured to the frame 58 using one or more mechanical fasteners, such as threaded fasteners.

The damper 74 of the mounting assembly 62 isolates the traction battery 14 from at least some of the forces imparted on the traction battery 14 from the frame 78. If, for example, the frame 78 vibrates due to the vehicle 60 traveling over rough terrain, the vibratory loads on the traction battery 14 will be damped due to the damper 74. The damping lengthens the time of transmitted shock forces and thus lowers a peak force of the load.

Figure 5:
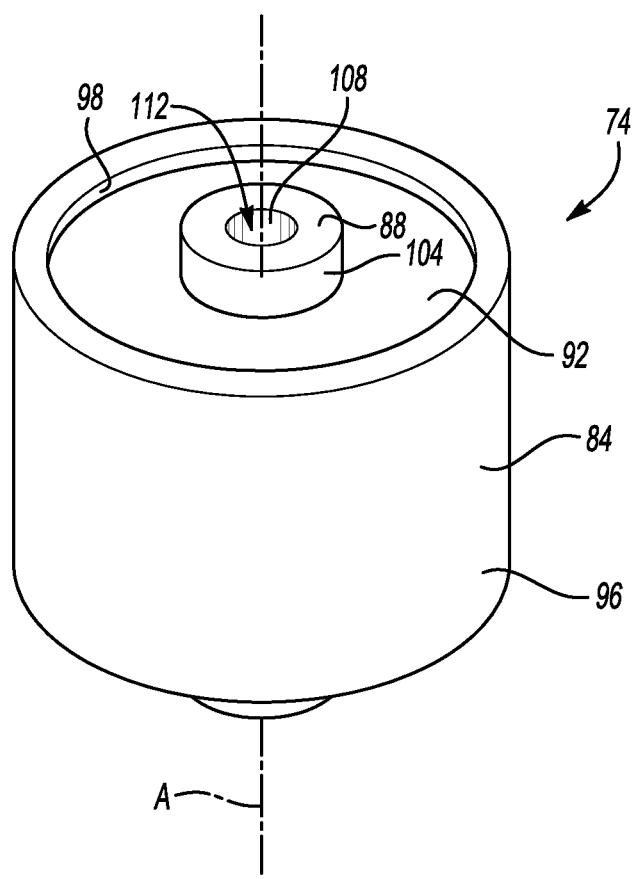
FIG. 5 illustrates a perspective view of a damper from the mounting assembly of FIG. 3.

Referring now to FIGS. 4-5 with continuing reference to FIGS. 2 and 3, the damper 74, in an exemplary non-limiting embodiment, includes an outer bushing 84, an inner bushing 88, and a damping portion 92 between the outer bushing 84 and the inner bushing 88. The outer bushing 84 and the inner bushing 88 are each cylindrical in this example. The damping portion 92 secures the outer bushing 84 to the inner bushing 88.

A radially outer surface 96 of the outer bushing 84 is rigidly secured to the bracket 66 of the traction battery 14, and a radially inner surface 98 of the outer bushing 84 is adhered to the damping portion 92. The bracket 66 could be welded to the radially outer surface 96 with welds 102, for example.

A radially outer surface 106 of the inner bushing 88 is adhered to the damping portion 92, and a radially inner surface 108 provides a bore 112. A mechanical fastener 116 extends through the bore 112 to engage a weld nut 120 of the bracket 70. The weld nut 120 is rigidly secured to the remaining portions of the bracket 70 with welds 122, for example.

The mechanical fastener 116 is torqued down to secure the damper 74 to the bracket 70. When secured, the inner bushing 88 directly contacts the bracket 70. When secured, the outer bushing 84 and the damping portion 92 are spaced from the bracket 70.

In an exemplary non-limiting embodiment, the damping portion 92 is electrically conductive. The damping portion 92 can be, for example, a high-carbon rubber that is both elastomeric and electrically conductive.

In other non-limiting embodiments, the damping portion 92 is electrically conductive because the damping portion 92 includes an elastomeric material 100 and a conductive material 104 embedded within the elastomeric material 100. In such an example, the elastomeric material 100 could be silicone 100A and the conductive material 104 could be an oriented metallic wire 104A distributed within the silicone (FIG. 4A). Other exemplary damping portions 92 could include metallized filled silicones, or silicones imbedded with wire screen.

The damping portion 92 is compressible relative to the outer bushing 84 and the inner bushing 88. The elastomeric material 100 permits the outer bushing 84 to move and flex relative to the inner bushing 88. As the outer bushing 84 and the bracket 66 are rigidly connected, the outer bushing 84 moves together with the bracket 66. As the inner bushing 88 and the bracket 70 are rigidly connected, the inner bushing 88 moves together with the bracket 70.

The damping portion 92 can permit the outer bushing 84 to rotate relative to the inner bushing 88 about an axis A of the bore 112. The damping portion 92 can permit the outer bushing 84 to tilt relative to the inner bushing 88 and the axis A.

If the damping portion 92 is electrically conductive, the damping portion 92 can provide a portion of an electrical ground path between the traction battery 14 and the frame 78. The electrical ground path can extend from bracket 66 of the traction battery 14, through the outer bushing 84, through the conductive material 104 of the damping portion 92, through the inner bushing 88, to the bracket 70 of the frame 78. Thus, when the damping portion 92 is electrically conductive, the traction battery 14 is electrically grounded to the frame 78 through the damper 74.

The bracket 66 is spaced from the second bracket 70, such that no portion of the bracket 66 contacts any portion of the bracket 70 when the damper 74 is securing the traction battery 14 to the vehicle frame 58. Electrically grounding through the damping portion 92 permits spacing between the bracket 66 and the bracket 70 without requiring a separate grounding structure.

If the damping portion 92 is not electrically conductive, a separate structure, such as a lead 110 (shown in FIG. 3), can be used to electrically ground the traction battery 14 to the frame 78. The lead 110 could be a braided wire, for example. If the damping portion 92 is electrically conductive, the lead 110 can be omitted.

Features of some of the disclosed examples include mounting a traction battery to a vehicle frame using a mounting assembly that isolates the traction battery from at least some vehicle loads. In some embodiments, a damper that isolates the traction battery provides a portion of a ground for electrically grounding the traction battery to the vehicle frame. When the damper is used for grounding, a separate grounding wire may not be required.

Notably, the mounting assembly isolates the traction battery from vehicle frame loads. Mounting assemblies that secure, for example, an internal combustion engine to a vehicle frame, protect the vehicle frame from engine loads.

The teachings of this disclosure could be particularly applicable to vehicles that experience high loads and vibrations, such as trucks.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery mounting assembly, comprising:
   a traction battery; and
   a damper securing the traction battery to a vehicle frame such that the traction battery can move together relative to the vehicle frame when secured to the vehicle frame, wherein the damper is electrically conductive such that the traction battery is electrically grounded to the vehicle frame through the damper.

2. The traction battery mounting assembly of claim 1, wherein a damping portion of the damper is electrically conductive and is compressible relative to a portion of the traction battery secured to the damper.

3. The traction battery mounting assembly of claim 2, wherein the damping portion includes an electrically conductive material distributed within an elastomeric material.

4. The traction battery mounting assembly of claim 1, further comprising an outer bushing, an inner bushing, and a damping portion of the damper, the damping portion securing the outer bushing to the inner bushing.

5. The traction battery mounting assembly of claim 4, wherein one of the outer bushing or the inner bushing is secured directly to the traction battery, and the other of outer bushing or the inner bushing is secured directly to the vehicle frame.

6. The traction battery mounting assembly of claim 1, further comprising a lead that electrically grounds the traction battery to the vehicle.

7. The traction battery mounting assembly of claim 1, further comprising a first bracket of the traction battery secured directly to the damper and a second bracket of the vehicle secured directly to the damper.

8. The traction battery mounting assembly of claim 7, wherein the first bracket is entirely spaced from the second bracket such that no portion of the first bracket contacts any portion of the second bracket when the damper is securing the traction battery to the vehicle frame.

9. The traction battery mounting assembly of claim 1, wherein the damper secures the traction battery to an underbody of the vehicle.

10. A traction battery securing method, comprising:
    through a damper, securing a traction battery in an installed position where the traction battery is mounted to a vehicle frame, the traction battery moveable relative to the vehicle frame when in the installed position, and
    electrically grounding the traction battery to the vehicle frame through the damper.

11. The traction battery securing method of claim 10, further comprising damping movement of the traction battery relative to the vehicle frame when the traction battery is in the installed position.

12. The traction battery securing method of claim 10, wherein a path for grounding the traction battery extends through a metallic material that is distributed within an elastomeric material of the damper.

13. The traction battery securing method of claim 10, wherein the securing comprises securing a first bracket of the traction battery directly to the damper and securing a second bracket of the vehicle frame directly to the damper.

14. The traction battery securing method of claim 13, wherein the damper includes a first bushing secured to the first bracket, a second bushing secured to the second bracket, and a damping portion connecting the first bushing to the second bushing.

15. The traction battery securing method of claim 10, further comprising electrically grounding the traction battery to the vehicle frame through a metallic lead extending from the traction battery to the vehicle frame.

* * * * *